United States Patent
Blanch et al.

[11] 3,715,526
[45] Feb. 6, 1973

[54] MINIATURIZED ELECTRIC CORD REEL

[75] Inventors: Charles H. Blanch, Maple Heights; James W. Kovacik, Parma, both of Ohio

[73] Assignee: Alert Stamping & Mfg. Co., Inc., Bedford Heights, Ohio

[22] Filed: March 15, 1971

[21] Appl. No.: 124,328

Related U.S. Application Data

[63] Continuation-in-part of Ser. No. 859,701, Sept. 22, 1969, Pat. No. 3,619,518.

[52] U.S. Cl.........191/12.2 R, 242/107 R, 242/107.6
[51] Int. Cl..............................................H02g 11/00
[58] Field of Search.....191/12.2 R, 12.4; 242/107 R, 242/107.6

[56] References Cited

UNITED STATES PATENTS

| | | | |
|---|---|---|---|
| 3,182,139 | 5/1965 | Melitti | 191/12.4 |
| 3,011,033 | 11/1961 | Belicka et al. | 191/12.2 R |
| 2,555,560 | 6/1951 | Timm | 191/12.2 R |
| 2,920,393 | 1/1960 | Schoenfeldt | 242/107 R |
| 2,374,457 | 4/1945 | Reeves | 242/107 R |

Primary Examiner—Gerald M. Forlenza
Assistant Examiner—George H. Libman
Attorney—Wesley B. Taylor

[57] ABSTRACT

An improved electric cord reel construction is provided that is characterized by its miniature size. The simplified, relatively small structure is lightweight, relatively inexpensive to manufacture and assemble. The principal component part of the reel is preferably molded from plastic and has combined features normally supplied by additional, different parts secured together by various fasteners, thereby avoiding in the present structure the usual overall heavy, relatively bulky assembly. In one form, this component comprises a unitary, cup-shaped member which is so compactly designed as to include a hub portion on which an electric cord reel is wound, a flange for guiding the deposition of the cord, commutator rings to receive and transmit electrical energy to the cord, a bearing for mounting a shaft around which the unitary member relatively rotates, and a housing for a coiled spring adapted to maintain the reel in a home position. The cup-shaped member receives and supports a second flange in spaced relation to its own flange, preferably at a spaced apart distance substantially equal to the width of a single electric cord.

13 Claims, 8 Drawing Figures

INVENTORS
CHARLES H. BLANCH
JAMES W. KOVACIK

Bosworth, Sessions,
Herstrom + Cain
ATTORNEYS

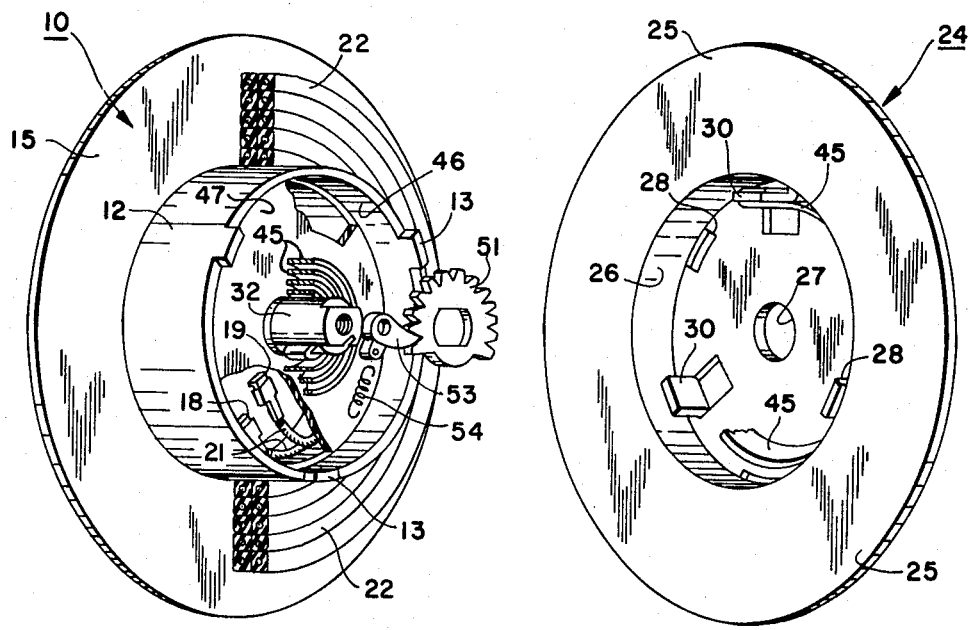
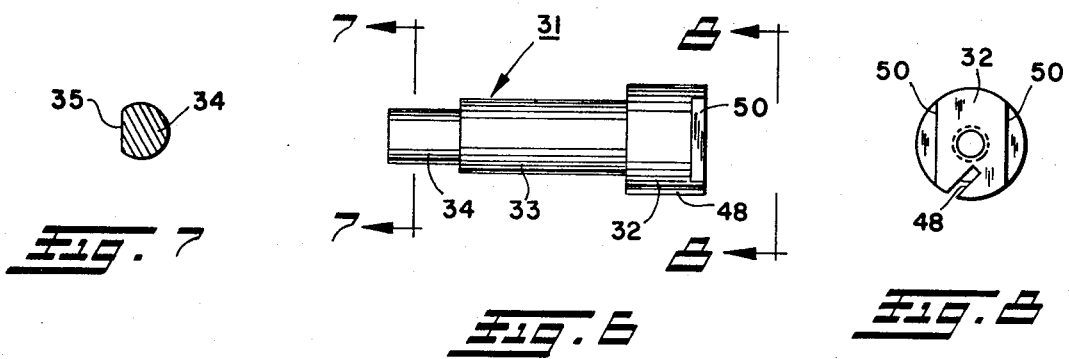

3,715,526

MINIATURIZED ELECTRIC CORD REEL

CROSS-REFERENCE TO RELATED APPLICATION

This application is a continuation-in-part of an application filed in the names of Charles H. Blanch and James W. Kovacik on Sept. 22, 1969, entitled "Electric Cord Reel Construction," and assigned Ser. No. 859,701, now U.S. Pat. No. 3,619,518.

BACKGROUND OF THE INVENTION

The present invention relates to electric cord reels and, more particularly, to miniaturized reels of improved, simplified structure embodying relatively lightweight, compact parts adapted for quick assembly.

Electric cord reels have been in use for many years, such as for paying out and receiving electric cord for lead lights, various electrical household appliances like sweepers, and in general wherever insulated electric conductors are to be optionally extended and retracted with respect to a relatively stationary point. While exterior designs may vary, prior electric cord reels basically comprise a reel and shaft, mounted to rotate relatively to each other; cooperating ratchet and pawl means carried by the shaft and reel, respectively, to arrest the turning of a reel at one of several selective rotary stations when the length of the cord paid out reaches a desired length; a coiled spring designed to rotate the reel in a backward direction and rewind the cord onto the reel when the ratchet and pawl are disengaged; and electrical input means including a commutator and the insulated electrical cord itself.

To date, many parts of such reels have been individually fabricated requiring individual stampings for each. Further, since reels are commonly hand-assembled, mass production techniques have been hampered because relatively more parts must be secured, one to the other, in the process of building a complete unit. All of this complicates and renders more expensive the commercial production of the reel structures.

The problems of weight, bulk, and ease of assembly are further accentuated when quite small reels are to be fabricated. Miniaturized reels, for example, find ready application for use with such appliances as toasters, electrical can openers, shavers, coffee pots, blenders, and other small home appliances.

It would, therefore, advance the art if an electric cord reel of simple construction were available and especially one of relatively lightweight parts which, additionally, so combined the features and functions of several parts of prior structures that mass assembly was appreciably facilitated and the reel could be fabricated in miniature form.

SUMMARY OF THE INVENTION

In the present electric cord reel, the number of individual parts is reduced by uniquely combining in several instances parts of prior reel structures and making them as one integral part. Assembly is, therefore, facilitated. Moreover, there is little or no need for soldering or welding in assembling the present cord reel, and the use of rivets and screws is minimized. Still further, certain of the combined parts are molded from plastics as a single, integral part, thereby eliminating stampings for the several parts and contributing to a lightweight structure without loss of strength for the intended purpose. These features contribute to the realization of a miniaturized reel which can be as small as one inch in overall axial width.

In one form, the present electric cord reel comprises a unitary construction member adapted to serve as a support for substantially the remaining parts of the reel. This construction member comprises a generally cup-shaped member having a substantially flat floor portion integral with an outwardly extending wall portion. The floor portion has an integral flange member which extends radially of the cup-shaped member outwardly past the wall portion as well as a centrally located hollow tubular projection which extends substantially coaxially with the wall portion and defines a shaft bearing. Commutator rings are embedded in the floor portion of the cup-shaped member on a side thereof remote from the wall portion. A second flange has a centrally located offset housing of a size telescopically to engage and fit upon an outer end of the wall portion and space that flange from the flange of the cup-shaped member a distance which is preferably equal to the width of an insulated electric cord.

The cup-shaped member contains a coiled spring designed to urge the reel toward a wound or home position. A shaft rides within the shaft bearing of the cup-shaped member and has a relatively fixed commutator contact block adapted to contact the commutator rings in the floor portion.

BRIEF DESCRIPTION OF THE DRAWINGS

The accompanying drawings illustrate a presently preferred embodiment wherein:

FIG. 4 is a perspective view of the left-hand flange of the reel and its attendant parts, as viewed in FIG. 1, with the ratchet and pawl means of FIG. 3 shown in exploded view;

FIG. 5 is a perspective view of the right-hand flange of the reel and its attendant parts, as viewed in FIG. 1, but in reverse perspective alignment as compared to the perspective view of its companion part of FIG. 5;

FIG. 6 is a front elevational view of the shaft of the reel;

FIG. 7 is a section of FIG. 6 on the line 7–7; and

FIG. 8 is a right-hand view of FIG. 6 on the plane of the line 8–8.

DESCRIPTION OF THE PREFERRED EMBODIMENT

Figure 1:
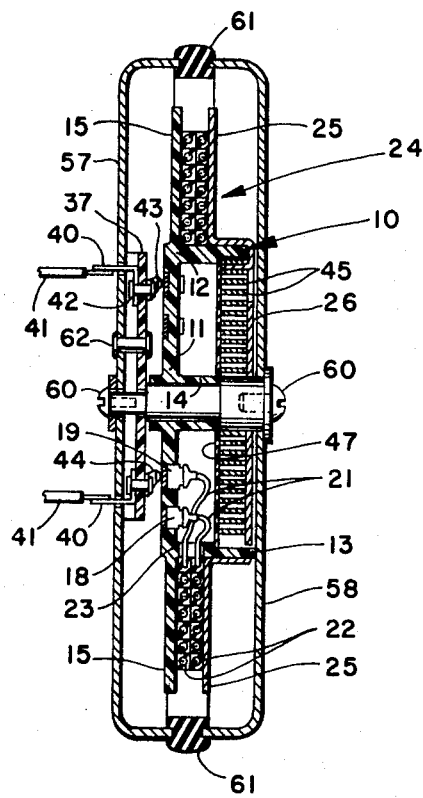
FIG. 1 is a radial, cross-sectional view of an electric cord reel assembly of the present invention.

Referring to the drawings, the embodiment illustrated includes a molded plastic, unitary, cup-shaped member, generally indicated at 10, having a flat floor portion 11 integral with an outwardly extending tubular wall portion 12 terminating in a plurality of axially extending, circumferentially spaced tabs 13. The floor portion 11 has an integral tubular projection 14 extending through the floor portion in coaxial alignment with the wall portion 12 to serve as a shaft bearing. An integral flange 15 having a reduced thickness with respect to the thickness of the floor portion 11 extends in planar alignment with the floor portion radially outwardly of the tubular wall portion 12.

A pair of flat commutator brass rings 16 and 17 is recessed directly into a side of the floor portion 11 that is remote from the wall portion 12 so as to be flush with that side. The rings are concentric with each other and with the shaft bearing 14. Rings 16 and 17 have tabs 18 and 19, respectively, which extends through the floor portion 11 and are suitably attached to leads 21 of an insulated electric cord 22. The cord passes through an opening 23 in the wall portion 12 of the cup-shaped member and is then wound upon the outside of the wall portion, each turn of the cord lying atop of a preceding turn (FIG. 1). The end of the cord 22 (not shown) may terminate in a conventional two-prong plug, electric jack, or the like.

A second flange member, generally indicated at 24, includes a planar, radially extending flange 25 having a centrally located, circular housing 26 that is offset from the plane of the flange and away from the cup-shaped member 10 as those parts are mated (FIGS. 4 and 5). The flat back side of the housing 26 has a central opening 27 to pass a shaft and a plurality of slots 28 near the circumference of the back side of the housing, the slots being of a number and distribution to register with and receive the tabs 13 from the outer end of the wall portion 12. A number of circumferentially spaced hooks 30 is punched inwardly from the flat back side of the housing.

The inside diameter of the housing 26 is only slightly oversized with respect to the outside diameter of the tubular wall portion 12 preferably to produce a tight fit between those parts. The axial depth or extent of the offset of housing 26 from the plane of the second flange 25 is designed to place flange 25 a distance from flange 15 that is substantially equal to the width of an insulated electric cord reel, when the cup-shaped member 10 and second flange member 24 are assembled as shown in FIG. 1. This enables a neat, even looping of the cord, prevents tangling, and contributes to the miniature size of the reel. If desired, the openings 28 and tabs 13 may be dimensioned to provide a tight, frictional press fit.

In addition to reducing weight, another advantage of fabricating the cup-shaped member from a thermoplastic plastic is that the ends of the tabs 13 that extend past the housing slots 28 can be melted and heat sealed against the exposed outside of the housing to secure the parts together. Alternatively, other standard mechanical means can also be used. Depending upon the physical demands to be placed on the electric cord reel during use, flange 25 and its housing 26 can be either plastic or metal. When plastic, flange 25 can be of the same or different plastic as that used for any of the other plastic parts of the reel. However, there is an advantage to making flange 15 and its integral parts including the wall portion 12 from a plastic to obtain readily their complicated shapes while contributing to the lightweightness of the reel and, at the same time, making the more simple flange and housing structure generally shown at 24 from metal, such as galvanized sheet metal. In combination with a plastic flange, a metallic flange 25 rigidifies and strengthens the overall assembly while not unduly adding to the overall weight.

Figure 2:
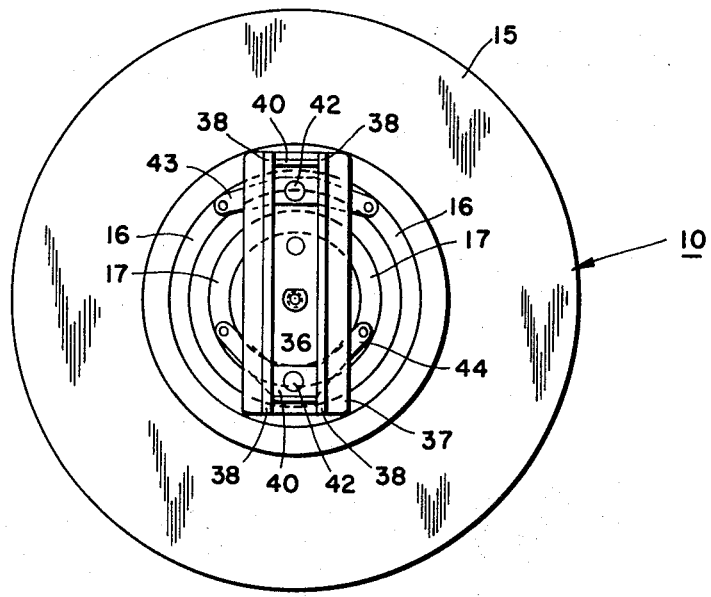
FIG. 2 is a left-hand side elevational view of FIG. 1 with the outer casing or housing removed.

FIGS. 1, 6, 7, and 8 illustrate an axially stepped, successively narrowing shaft 31 that may be used with the reel. In use, the shaft is stationary while the cup-shaped member 10 and flange member 24 revolve in unison around the shaft. One axial section 32 of the shaft is largest in cross-section and has a diameter just undersized to pass through opening 27 of housing 26 and seat against the outer end of the shaft bearing 14. Another axial section 33 of reduced cross-section as compared to section 32 has the greatest axial length which corresponds substantially to the length of the shaft bearing 14. A further axial section 34 of reduced cross-section as compared to section 33 has a flat land 35 and passes through an opening 36 of like configuration in a rectangular commutator contact block 37 (FIG. 2), the flat land 35 and matching opening 36 preventing the block 37 from turning relatively to the shaft 31.

The commutator contact block 37 is fabricated from a non-electroconducting material such as a plastic and has a pair of spacing ribs 38 (FIG. 2) between which two L-shaped metal tabs 40 are riveted. Electrical leads 41 supplying current to the reel are conventionally attached to the tabs 40. Rivets 42 which secure tabs 40 to block 37 also attach the tabs to resilient contact brushes 43 and 44 disposed along the back face of the block 37. Brush 43 contacts commutator ring 16, while brush 44 rides against commutator ring 17.

A spirally coiled spring 45 maintains the reel in a home position in which the cord 22 is completely wound around the wall portion 12. The outer end of the cup-shaped member is recessed at 46 to form a seat for spring 45, so that it is substantially aligned radially of the cup-shaped member 10 with the telescoping parts of the wall portion 12 and housing 26. A relatively thin, non-electrical conducting separator disc 47 seats against the shoulder of the recess 46 ahead of the spring. One end of the spring 45 is caught within a slot 48 in section 32 of the shaft (FIG. 8). The other end of the spring engages the closest of the hooks 30 punched from the housing 26 and in this manner is secured with respect to the cup-shaped member 10. The remaining hooks 30 serve to center the coiled spring centrally of the housing.

Figure 3:
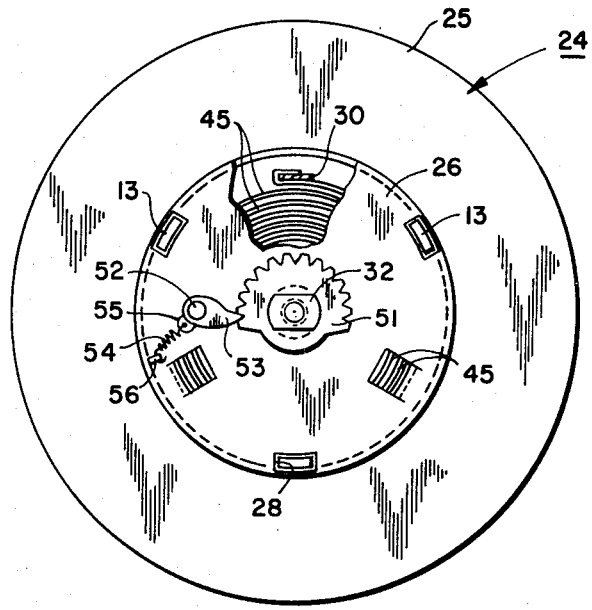
FIG. 3 is a right-hand side elevational view of FIG. 1 with the outer casing removed and illustrates the optional use of ratchet and pawl means.

Ratchet and pawl means are not required, since a relatively short pull on the cord provides sufficient length for most applications, and the spring 45 readily returns the reel and rewinds the cord when it is released. Should a ratchet and cooperating pawl be desired, however, these parts may be mounted on the shaft 31 and housing 26 as illustrated by FIGS. 3 and 4. The particular ratchet and pawl combination used does not form a part of the present invention and may be any known in the art. For example, the ratchet and pawl structures may be those disclosed in Blanch and Olzak U.S. Pat. No. 3,432,623 or in Blanch and Olzak U.S. Pat. No. 3,450,369. In the embodiment illustrated, section 34 of shaft 31 has opposed lands 50 (FIG. 8) around which a ratchet 51 is fixed as by a press fit. A rivet 52 rotatably secures a pawl 53 to the back of the housing 26, and a coiled spring 54 connects an ear 55 of the pawl 53 to a tab 56 formed on the back of the housing to urge the pawl 53 into engagement with teeth of the ratchet 51.

While, if desired, an electric cord reel may be used with only the parts previously described in assembly and suitable electric means employed to supply electrical energy to the rings 16 and 17 embedded in floor portion 11, it is preferable for reasons of safety and appearance to encase the electric cord reel together with the commutator contact block 37 in a suitable housing having a peripheral opening through which cord 22 may pass. The reel housing shown in the illustrated embodiment includes a pair of cooperating, bowl-shaped outer sections 57 and 58 (FIG. 1) held to the ends of shaft 31 by bolts 60 which engage threaded openings at the ends of the shaft 31. An elastomeric band 61 has grooves along its sides to receive the edges of the sections 57 and 58 and thereby complete the housing. Section 57 has openings to pass the metal tabs 40 of the commutator contact block, while a rivet 62 aids in holding the block 37 with respect to the section.

The present electric cord reel is easy to assemble, most parts fitting or connecting with the cup-shaped member 10. The reel is, therefore, well adapted for a production line technique. The number of rivets and bolts is substantially reduced. Soldering and welding are virtually eliminated from the reel structure itself, although in some instances the electrical leads 21 of the cord 22 may be soldered to the tabs 18 and 19 of the commutator rings 16 and 17. The present reel so reduces the number of parts that due to the resulting reduced bulk and size, the reel can be made in miniaturized form, for example, about 1 inch in axial length and about 4 inches in overall diameter.

As used here and in the claims, the term "plastic" is taken to mean any of the well known, synthetic, organic, resinous polymers suitable for molding. As an example, such plastics may include the acrylic polymers such as polymethyl methacrylate; the cellulosic molding compounds such as ethyl cellulose, cellulose acetate, cellulose acetate butyrate, and cellulose nitrate; polyethylene; polypropylene; polystyrene; polyvinyl polymers such as polyvinyl chloride, polyvinylidene chloride, polyvinyl acetate, polyvinyl alcohol, polyvinyl butyral, and copolymers thereof; polyurethanes; melamine-formaldehyde and urea-formaldehyde molding compounds; phenol-formaldehyde and phenol-furfural molding compounds; polyesters; epoxy resins; polytetrafluorethylene; and the like. Polyamides such as nylon are preferred.

While the foregoing describes a presently preferred embodiment, it is understood that the invention may be practiced in still other forms within the scope of the following claims.

What is claimed is:

1. In an electric cord reel, a unitary construction member adapted to serve as a support for substantially the remaining parts of the reel, said unitary construction member comprising a generally cup-shaped member having a substantially flat floor portion integral with an outwardly extending wall portion, said cup-shaped member having a first flange member extending radially outwardly past the wall portion, and an essentially centrally located hollow projection extending substantially coaxially with the wall portion and from the floor portion to define a shaft bearing adapted to receive a shaft, commutator rings secured to said floor portion of the cup-shaped member on a side thereof remote from said wall portion, a second, generally planar flange member having a housing offset from the plane of said second flange member and fitted to said wall portion to space said flange member inwardly of the end of said wall portion, and a coiled spring contained within said cup-shaped member, one end of the spring being adapted to be secured to such shaft within shaft bearing, and the other end of the spring being secured with respect to the cup-shaped member.

2. The electric cord reel of claim 1 in which said cup-shaped member is formed from a plastic material.

3. The electric cord reel of claim 1 in which said second flange member is metallic.

4. The electric cord reel of claim 1 in which said commutator rings are embedded in said floor portion on a side thereof remote from said wall portion.

5. The electric cord reel of claim 1 in which a shaft is mounted in said hollow projection defining a shaft bearing for relative rotation therewith, one end of the spring being secured to the shaft.

6. The electric cord reel of claim 5 in which the coiled spring is substantially aligned radially of the cup-shaped member with the telescoping parts of said wall portion and housing, and the end of the coiled spring which is secured with respect to the cup-shaped member is secured to hook means on said housing.

7. The electric cord reel of claim 1 in which a shaft is mounted in said hollow projection defining a shaft bearing for relative rotation therewith and extends through said floor portion of the cup-shaped member, and a commutator contact block is mounted on the shaft for rotation therewith relatively to said cup-shaped member and adapted to contact the commutator rings in said floor portion.

8. The electric cord reel of claim 1 in which a shaft is mounted in said hollow projection defining a shaft bearing for relative rotation therewith and extends through said housing of said second flange member, ratchet means mounted on a part of the shaft so extending through the housing, and pawl means mounted on said second flange member for engagement with said ratchet means.

9. The electric cord reel of claim 1 in which a shaft is mounted in said hollow projection defining a shaft bearing for relative rotation therewith, and said shaft has an axially offset portion to seat against the end of the hollow projection.

10. The electric cord reel of claim 1 in which the outer end of said wall portion has a plurality of axially extending, circumferentially spaced tab portions, and said second flange member has openings adapted to receive said tab portions to secure said parts together.

11. The electric cord reel of claim 1 in which an inner periphery of said wall member is recessed to provide a seat for said coiled spring.

12. In an electric cord reel, a unitary construction member adapted to serve as a support for substantially the remaining parts of the reel, said unitary construction member comprising a generally cup-shaped plastic member having a substantially flat floor portion integral with an outwardly extending wall portion, said floor portion having an integral first flange member extending radially of the cup-shaped member outwardly past the wall portion, and an essentially centrally located tubular projection extending substantially coaxially with the wall portion to define a shaft bearing, commutator rings embedded in said floor portion of the cup-shaped member on a side thereof remote from said wall portion, a second generally planar flange member having a substantially centrally located, offset housing of a size to telescope and tightly engage an outer end of said wall portion and space said second flange member from the first flange member a distance substantially equal to a width of an electric cord, a shaft mounted in said hollow projection for relative rotation therewith, a coiled spring contained within said cup-shaped member, one end of the spring being secured to the shaft and the other end of the spring being secured with respect to the cup-shaped member, and a commutator contact block mounted on the shaft for rotation therewith relative to the cup-shaped member and adapted to contact the commutator rings in said floor portion.

13. The electric cord reel of claim 1 in which said coiled spring is disposed radially of said cup-shaped member and substantially flush with the outer open end of the wall portion.

* * * * *